(12) United States Patent
Rudden et al.

(10) Patent No.: US 11,093,636 B2
(45) Date of Patent: Aug. 17, 2021

(54) MAINTAINING DATA PROTECTION COMPLIANCE AND DATA INFERENCE FROM DATA DEGRADATION IN CROSS-BOUNDARY DATA TRANSMISSION USING CONTAINERS

(71) Applicant: INTERNATIONAL BUSINESS MACHINES CORPORATION, Armonk, NY (US)

(72) Inventors: Mary E. Rudden, Denver, CO (US); Thanh Lam, Fontana, CA (US); Daniel S. Riley, Durham, NC (US); Craig M. Trim, Ventura, CA (US); Rhonda L. Childress, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 16/152,860

(22) Filed: Oct. 5, 2018

(65) Prior Publication Data
US 2020/0110896 A1  Apr. 9, 2020

(51) Int. Cl.
*G06F 21/00* (2013.01)
*G06F 21/62* (2013.01)

(52) U.S. Cl.
CPC ............................... *G06F 21/6245* (2013.01)

(58) Field of Classification Search
CPC ......... H04L 5/0091; H04L 1/08; H04L 5/001; H04L 25/03343; H04L 47/10; G06F 21/6245
See application file for complete search history.

(56) References Cited

U.S. PATENT DOCUMENTS

| | | |
|---|---|---|
| 8,504,481 B2 | 8/2013 | Motahari et al. |
| 9,721,108 B2 | 8/2017 | Krishnamurthy et al. |
| 9,882,935 B2 | 1/2018 | Barday |
| 2006/0272024 A1* | 11/2006 | Huang .................. G06F 21/577 726/26 |
| 2010/0024042 A1 | 1/2010 | Motahari et al. |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Ghazal B Shehni
(74) *Attorney, Agent, or Firm* — Brian Restauro; Andrew D. Wright; Roberts Calderon Safran & Cole, P.C.

(57) ABSTRACT

A computer-implemented method includes: receiving, by a computing device, a container from a data requester server for processing data as part of an inference analysis; attaching, by the computing device, an input data volume and an output data volume associated with the container; processing, by the computing device, input data stored in the input data volume to produce output data; attaching, by the computing device, the output data in the output data volume; detaching, by the computing device, the input data volume based on attaching the output data to the output data volume; determining, by the computing device, whether sensitive data exists in the output data volume; and providing, by the computing device, the output data volume to the data requester server based on the determining that sensitive data does not exist in the output data volume.

20 Claims, 10 Drawing Sheets

(56) References Cited

U.S. PATENT DOCUMENTS

| | | | |
|---|---|---|---|
| 2016/0026802 A1 | 1/2016 | Krishnamurthy et al. | |
| 2017/0243028 A1* | 8/2017 | LaFever | G06F 21/6263 |
| 2017/0359387 A1 | 12/2017 | Barday | |
| 2017/0372096 A1* | 12/2017 | Yousfi | G06F 21/6254 |
| 2018/0054445 A1 | 2/2018 | Rhee et al. | |
| 2018/0075138 A1 | 3/2018 | Perram et al. | |
| 2019/0140892 A1* | 5/2019 | Jain | H04L 41/16 |

OTHER PUBLICATIONS

Kaisler et al.,"Big data: Issues and challenges moving forward", System sciences (HICSS), 46th Hawaii international conference on, pp. 995-1004, 2013, 10 Pages.

Danezis et al., "Privacy and Data Protection by Design—from policy to engineering", European Union Agency for Network and Information Security, 2014, 79 pages.

Ruddy, "Data Analytics: Descriptive Vs. Predictive Vs. Prescriptive", Blood Analytics, Aug. 21, 2015, 3 pages.

* cited by examiner

```
docker login cedp-docker-local.artifactory.swg-devops.com -u <Intranet-
ID> -p <API-Keys> docker pull cedp-docker-local.artifactory.swg-
devops.com/gtscdo/container/infosec-mysql:5.7 mkdir /data
mkdir /data/infosec docker run --name geo_alpha_mysql  -p 3306:3306     -v
/data/infosec:/var/lib/mysql  -d   cedp-docker-local.artifactory.swg-
devops.com/gtscdo/container/infosec-mysql:5.7
```

FIG. 9

MAINTAINING DATA PROTECTION COMPLIANCE AND DATA INFERENCE FROM DATA DEGRADATION IN CROSS-BOUNDARY DATA TRANSMISSION USING CONTAINERS

BACKGROUND

The present invention generally relates to maintaining data protection compliance and data inference and, more particularly, to maintaining data protection compliance and data inference from data degradation in cross-boundary data transmission using containers.

Data inference involves drawing conclusions about data from an analysis and/or collection of data. Accurate data inference is often relied on in systems, such as inventory management, which encompasses millions of products across a complex global supply chain and involves getting the right stock to the right place at the right time. Up to date inventory management is essential to providing accurate demand forecasts, inventory and replenishment plans across your global supply chain.

A container is a stand-alone executable package of a piece of software that includes everything needed to run it, including application code, runtime, system tools, system libraries, and settings. Containers are lightweight and constructed from layered filesystems, e.g., sharing common files, making disk usage and image downloads efficient. A container can run in various environments including but not limited to a local computing device (e.g., a desktop or a laptop), physical or virtual machines in a data center, and cloud providers. "Docker" is an open-source project that automates the deployment of applications inside software containers by providing an additional layer of abstraction and automation of operating-system-level virtualization.

SUMMARY

In an aspect of the invention, a computer-implemented method includes: receiving, by a computing device, a container from a data requester server for processing data as part of an inference analysis; attaching, by the computing device, an input data volume and an output data volume associated with the container; processing, by the computing device, input data stored in the input data volume to produce output data; attaching, by the computing device, the output data in the output data volume; detaching, by the computing device, the input data volume based on attaching the output data to the output data volume; determining, by the computing device, whether sensitive data exists in the output data volume; and providing, by the computing device, the output data volume to the data requester server based on the determining that sensitive data does not exist in the output data volume.

In an aspect of the invention, there is a computer program product including a computer readable storage medium having program instructions embodied therewith. The program instructions executable by a computing device to cause the computing device to: receive a container from a data requester server for processing data as part of an inference analysis; attach an input data volume and an output data volume associated with the container; process input data stored in the input data volume to produce output data; attach the output data in the output data volume; detach the input data volume based on attaching the output data to the output data volume; determine whether sensitive data exists in the output data volume; based on determining that sensitive data exists in the output data volume, recursively re-process the output data volume until sensitive data no longer exists in the output data volume; and provide the output data volume to the data requester server based on determining that sensitive data does not exist in the output data volume.

In an aspect of the invention, a system includes: a processor, a computer readable memory and a computer readable storage medium associated with a computing device; program instructions to send a script to a data provider and compliancy server that is outside of a boundary of the computing device, wherein the script includes a request for data and instructions for analyzing the requested data; program instructions to receive a profile level object based on sending the script; program instructions to generate a container based on the profile level object; program instructions to send the container to the data provider and compliancy server; program instructions to receive, from the data provider and compliance server, an output data volume associated with the container, without receiving an input data volume associated with the container; program instructions to perform and present an inference analysis based on the output data, wherein the output data complies with data restrictions of the boundary within which the computing device resides. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 9 shows sample code for implementing one or more aspects of the present invention.

DETAILED DESCRIPTION

Figure 1:
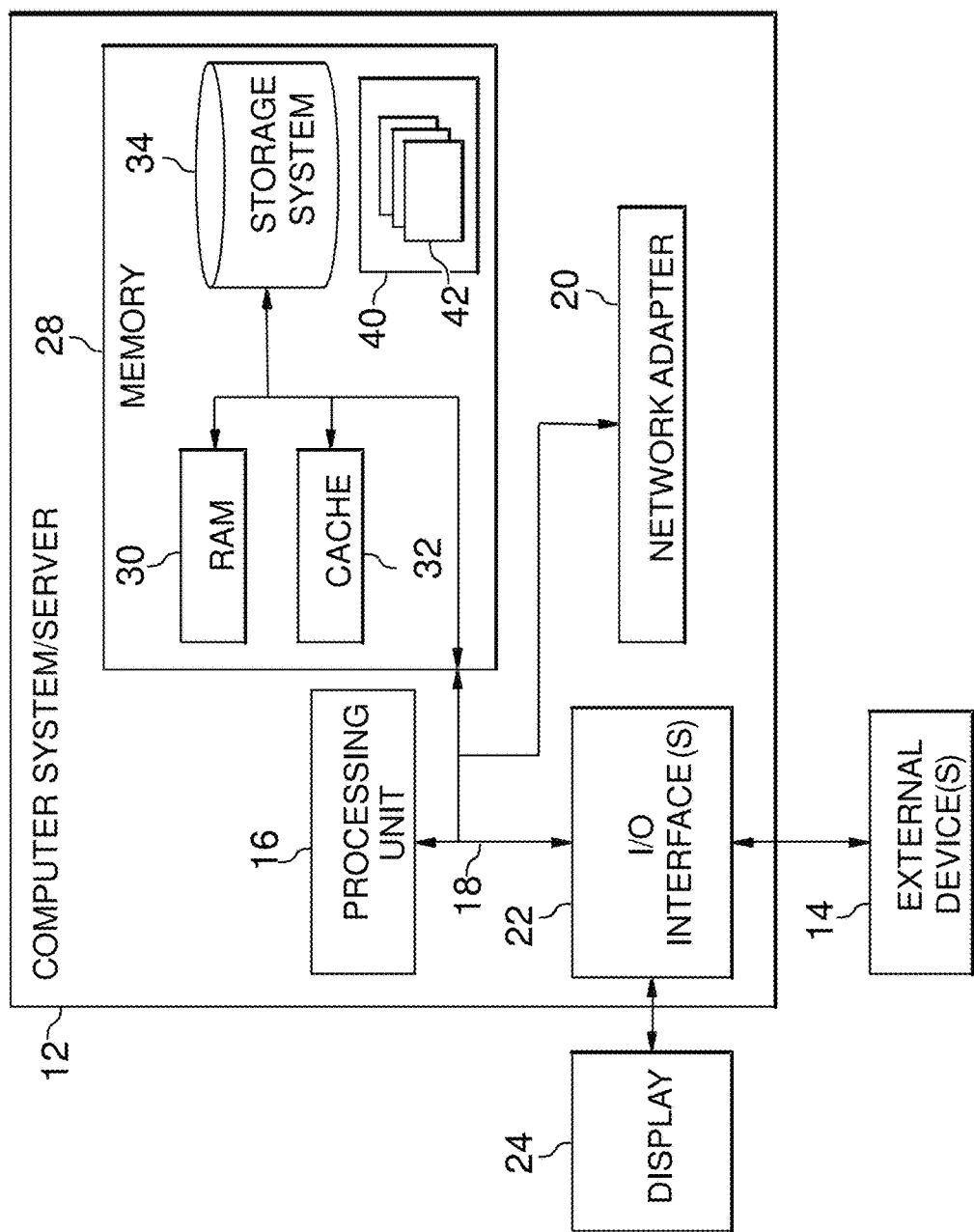
FIG. 1 depicts a cloud computing node according to an embodiment of the present invention.

The present invention generally relates to maintaining data protection compliance and data inference and, more particularly, to maintaining data protection compliance and data inference from data degradation in cross-boundary data transmission using containers.

A key complexity in global inventory management is that the underlying systems are distributed across multiple geographies. As is so often the case with merging disparate data systems, the initial stage of data preprocessing encompasses incomplete, down level, inaccuracies and other situations. On top of this, multiple accounts and geographies have data residency restrictions that do not allow data to leave either the client premises or the country.

When data is collected and transmitted across multiple boundaries, the inference capability within a certain boundary is proportional to the number of data restrictions. When transmitting data (e.g., analytics data) outside of a particular boundary (e.g., geographic boundary, network boundary, etc.) the inference power of the data decreases, as the richness of the data may be reduced to comply with privacy requirements. As an example, an analytics system may be able to infer multiple demographic and social economic status (SES) attributes about individuals while the data resides in a home state or home boundary, but the moment the data is brought outside to another boundary (e.g., to combine with additional data), the inference power decreases. The analytics system will likely have only limited inference ability such as the ability to infer only two or three basic attributes and with lower confidence. Essentially, data inference capability decreases the further the data travels from an origin. Also, privacy requirements (e.g., General Data Protection Regulation (GDPR) requirements) may be unintentionally broken when transmitting data across boundaries. Further, handling the transmission of "unstructured" content, (e.g., content with documents or files on file shares, personal computing devices, content management systems, etc.). These files can be generated within and outside the organization boundaries using many applications, can be converted to multiple file formats (most commonly to PDF), and seemingly have unlimited form and content. Accordingly, aspects of the present invention improve compliance with data privacy requirements during cross-boundary data transmission, while also improving the level of inference degradation that is caused by privacy requirement compliance.

As described herein, aspects of the present invention include an automated construction of containers (e.g., docker containers) that collect data (e.g., inventory data and/or other types of data) where data restrictions exist for transmitting the data across data restriction boundaries (e.g., physical geographic boundaries, country boundaries, network boundaries, etc.). For example, some accounts and/or geographies have data residency restrictions which do not allow data to leave client premises or country. In accordance with aspects of the present invention, containers are used to collect data where such restrictions exist.

Aspects of the present invention implement a multi-step process for improving compliance with data privacy requirements during cross-boundary data transmission, while also improving the level of inference degradation that is caused by privacy requirement compliance. For example, in accordance with aspects of the present invention, a program is sent by a data requester to a data provider that analyzes the data for sensitive data (e.g., personally identifiable information (PII)). In embodiments, profiled characteristics of the data are built up and sent back to the data requester, and the data requester generates a container (e.g., a docker container) based on this profile and deploys the container in a registry. In embodiments, the data provider pulls an instance of the container from the repository and attaches two data containers into volumes (e.g., an input container volume and an output counter volume). In embodiments, processing of the input container volume occurs within the container on the data provider's premises. As described herein, the input container includes a complete set of rich data hosted by the data provider, and the data is processed to produce the output container which includes only the data that is compliant and permitted to be transmitted based on the criteria/restrictions of the origin and destination of the data.

In embodiments, if the container leaves the premises for processing, geo-specific compliance restrictions are triggered and the data volumes are destroyed (e.g., to prevent non-compliant data from being transmitted). In embodiments, processing is completed (e.g., when the container is able to be processed on the premises of the data provider) by filtering out non-compliant privacy data and attaching output data to the output data volume). In embodiments, pursuant to processing the data, the input data volume is detached, and the container and output data volume is scanned for PII and sent back to the data requester if the PII data either does not exist or is allowed to be sent to the data requester (e.g., based on the location/boundary of the data requester). That is, the data requester receives the output data volume without the input data volume.

If PII data exists in the output data volume and the PII data is not allowed to be sent to the data requester, aspects of the present invention recursively loop back by treating this output data as input data, attaching another input data volume with the prior output data, processing the data to form new output data, and attaching the new output data to a new output data volume. In embodiments, the process is repeated until the output data does not include any PII data (or other type of sensitive data) that is not allowed to be sent to the data requester based on data privacy criteria/requirements. As such, only a minimal amount of data is removed from each round of processing. In this way, the data requester receives only compliant data with minimal inference degradation, as the output data volume is derived from the rich data included in the input data volume.

In embodiments, the master container is able to reside in another geography but is subject to being processed in accordance with the above process in order to comply with privacy requirements. In embodiments, the child container is analyzed along with all other child containers in a recursive manner.

As described herein, aspects of the present invention provide a particular solution to a particular technical problem of data privacy compliance through the enforcement of data privacy criteria and restrictions while minimizing inference degradation of that data when the data crosses boundaries. In embodiments, aspects of the present invention improve computer resource usage and efficiency by transmitting only compliant data to a data requester, rather than an entire set of data which is not compliant. Further, data that is most critical to an analytics application is provided while less critical and non-compliant data is not transmitted. Accordingly, as a result of these improvements in computer resource usage and efficiency, computer memory, computer processing cycles, network load, network congestion, and/or other computer resource usage is conserved and reduced, thus increasing the speed and capacity of computer systems used to transmit and process analytics data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
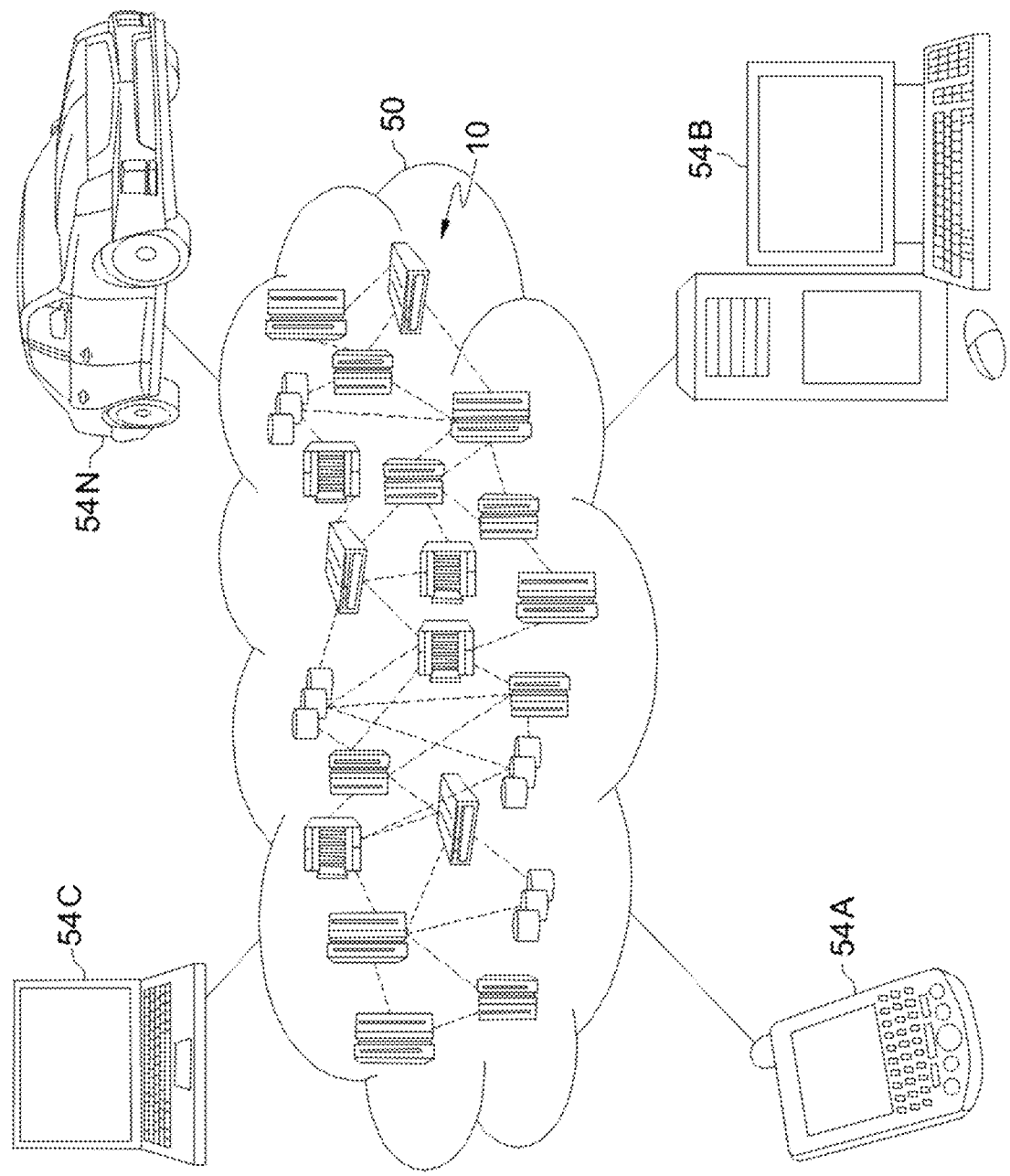
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
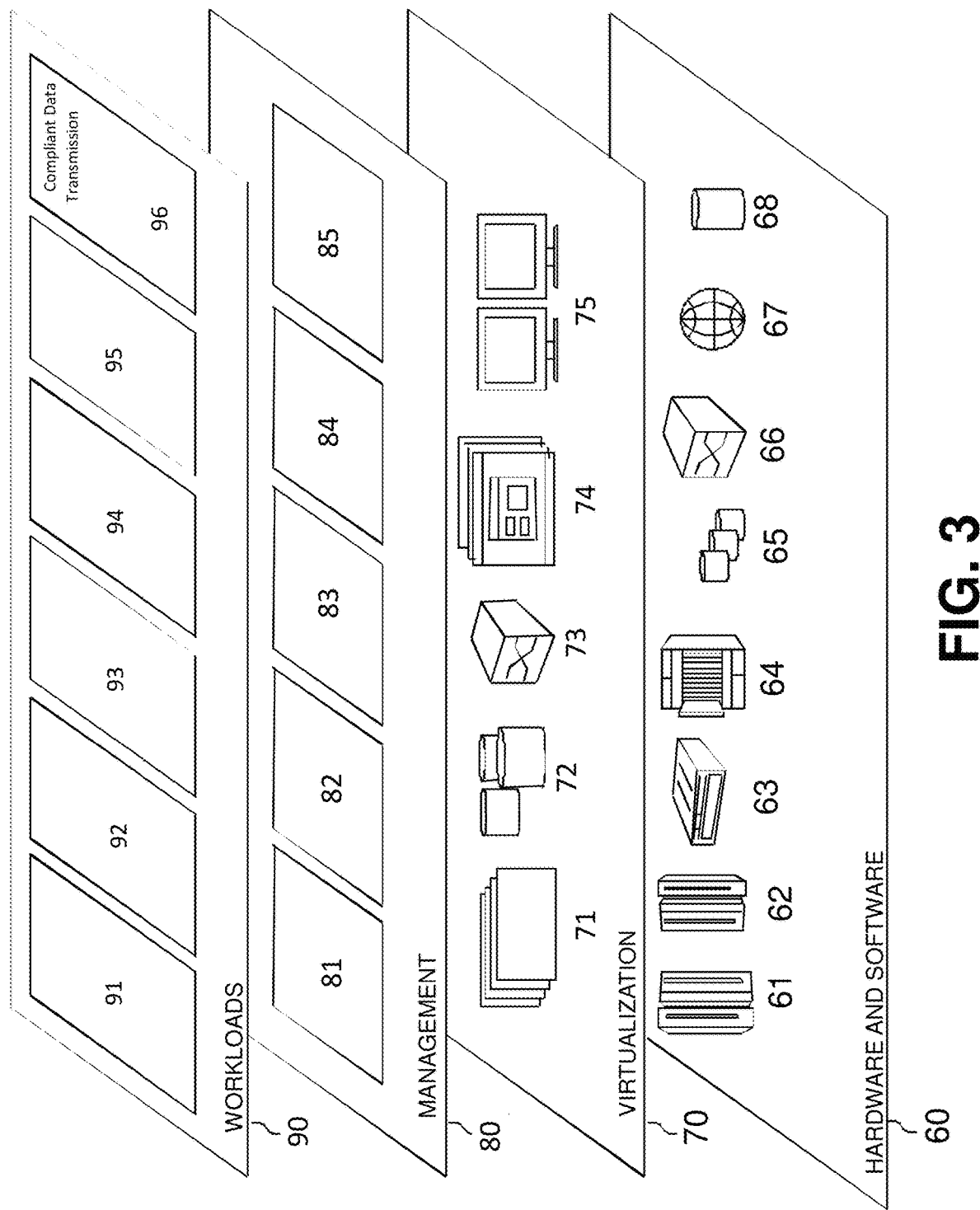
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compliant data transmission 96.

Referring back to FIG. 1, the program/utility 40 may include one or more program modules 42 that generally carry out the functions and/or methodologies of embodiments of the invention as described herein (e.g., such as the functionality provided by compliant data transmission 96). Specifically, the program modules 42 may receive a container from a data requester, attach input and output data volumes based on receiving the container, process the input data and attached processed data to the output data volume, detach the input data volume, check for sensitive data in the output data volume, and provide the output data volume to the data requester if no sensitive data exists, or treat the output data as input data for a subsequent round of processing until no sensitive data exists. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a data provider and compliancy server as shown in FIG. 4.

Figure 4:
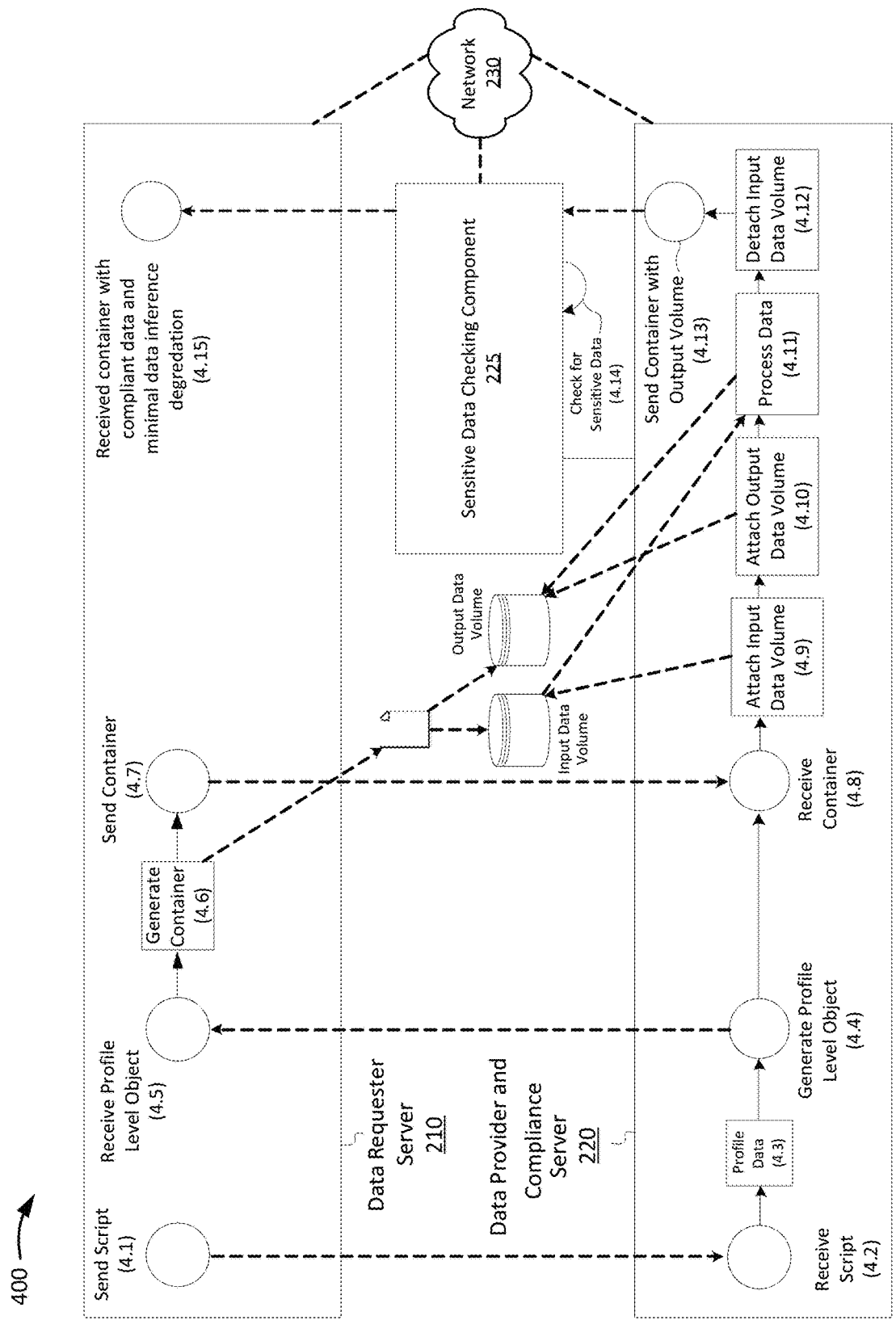
FIG. 4 shows an overview of an example implementation and environment in accordance with aspects of the present invention.

FIG. 4 shows an overview of an example implementation and environment in accordance with aspects of the present invention. As shown in FIG. 4, environment 400 includes a data requester server 210, a data provider and compliance server 220, a sensitive data checking component 225, and a network 230. In embodiments, one or more components in environment 400 may correspond to one or more components in the cloud computing environment of FIG. 2. In embodiments, one or more components in environment 400 may include the components of computer system/server 12 of FIG. 1.

The data requester server 210 includes one or more computing devices (e.g., such as computer system/server 12 of FIG. 1) that requests data (e.g., analytics data) from the data provider and compliance server 220. In embodiments, the data requester server 210 requests the data in connection with performing an analysis on the data (e.g., inventory analysis, efficiency analysis, marketing analysis, product interest analysis, consumer behavior analysis, etc.).

The data provider and compliance server 220 includes one or more computing devices (e.g., such as computer system/server 12 of FIG. 1) that processes a request for data received from the data requester server 210. In embodiments, the data provider and compliance server 220 includes a sensitive data checking component 225 that checks whether requested data includes sensitive data and to filter out sensitive data (e.g., non-compliant data that is not allowed to cross a boundary) prior to the data being sent back to the data requester server 210.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

As shown in FIG. 4, the data requester server 210 sends a script (at step 4.1) to the data provider and compliance server 220. In embodiments, the script identifies the data requested for inference analysis by the data requester server 210 and analysis instructions for analyzing the data based on profiled characteristics of the data. At step, the 4.2 the data provider and compliance server 220 receives the script and profiles the data based on the instructions included in the script (step 4.3). For example, the data provider and compliance server 220 profiles the data by identifying PII information and determining a level of sensitivity of the data. In embodiments, the profile of the data corresponds to the data's level of sensitivity. In embodiments, the data provider and compliance server 220 approaches this profiling by the detection of PII flags or cues. For example, the presence of "SS#" or "Employee ID" or numerical patterns in certain formats (such as credit cards, phone numbers, addresses, etc.) will trigger a PII flag. At step 4.4, the data provider and compliance server 220 generates a profile level object that identifies a profile level (e.g., security/sensitivity level) of the profiled data. At step 4.5, the data requester server 210 receives the profile level object and generates a container based on the indicated profile level from profile level object (step 4.6). As described herein, the data requester server 210 generates a container (e.g., a docker container) that includes a set of geo-specific criteria from which input data is processed. Additionally, in embodiments, the container includes a set of applications, scripts, etc., for processing the data as part of an inference analysis of the data. In embodiments, the type of applications to include in the container is based on the type inference analysis to perform, which, in embodiments, is based on the profile level. At step 4.7, the data requester server 210 sends the container to the data provider and compliance server 220.

At step 4.8, the data provider and compliance server 220 receives the container and attaches an input data volume (step 4.9) and an output data volume (step 4.10). In embodiments, the input data volume contains input data such as the requested data identified in the script (from step 4.2). At step 4.11, the input data (stored in the input data volume) is processed by executing the container (generated at step 4.6). For example, the input data is processed in accordance with an inference analysis of the data (e.g., to draw inferences and/or certain conclusions based on the data). As an illustrative example, the input data is processed as part of a marketing analysis to infer customer buying habits regarding a type of product. Further, the data is processed with the geo-specific criteria included in the container. As described herein, the geo-specific rules stipulate that if processing the input data requires that the input data cross a boundary, the associated input data volume is destroyed, such that data restriction requirements are not violated when processing the data. However, data processing is completed if the data does not need to cross a boundary when processing the data.

In embodiments, the processed data is attached to the output data volume. At step 4.12, the input data volume is detached, and the container with only the output data is sent towards the data requester server 210 (step 4.13). In this way, only the output data from the output data volume is provided, so that the original unprocessed input data that was not processed with the geo-specific criteria and data that has not been analyzed with respect to an inference analysis is filtered out.

At step 4.14, the sensitive data checking component 225 performs a check to ensure that the output data does not include any remaining sensitive data (e.g., PII data). In embodiments, the sensitive data checking component 225 performs the PII check based on the destination of the data (e.g., the location and boundary of the data requester server 210). For example, PII data may be allowed if the data requester server 210 is located within a same boundary as the data provider and compliance server 220, whereas some PII data may not be allowed if the data requester server 210 is located within a different boundary as the data provider and compliance server 220. If no sensitive data exists, or if the sensitive data is allowed to be transmitted, then at step 4.15, the data requester server 210 receives the container with compliant data (e.g., the container with the output data from step 4.13 and checked at step 4.14). The data included in the received container has minimal data inference degradation since only a minimum amount of data required to be filtered by data privacy requirements is excluded.

If, for example, the output data (at step 4.13) includes sensitive information that is not allowed to be transmitted to the data requester server 210 (e.g., based on the sensitive data check at step 4.14), the output data is fed into the input data volume (at step 4.9), a new output data volume is attached (at step 4.10, and the new data (e.g., prior output data) is treated as input data, re-processed (e.g., at step 4.11), and attached in the output data volume. The input volume is detached (at step 4.12), the container with the output volume is sent and checked for sensitive data (4.13, and 4.14), and received by the data requester server 210 (at step 4.15) if the re-processed output volume does not include sensitive data or includes sensitive data that is allowed to be provided to the data requester server 210. Steps 4.9-4.14 are repeated in a recursive manner until the output data passes the sensitivity check. In this way, the data is re-processed until data restrictions have been met, but only re-processed the minimum number of times to comply with the data restrictions, thus minimizing the inference degradation.

Figure 5A:
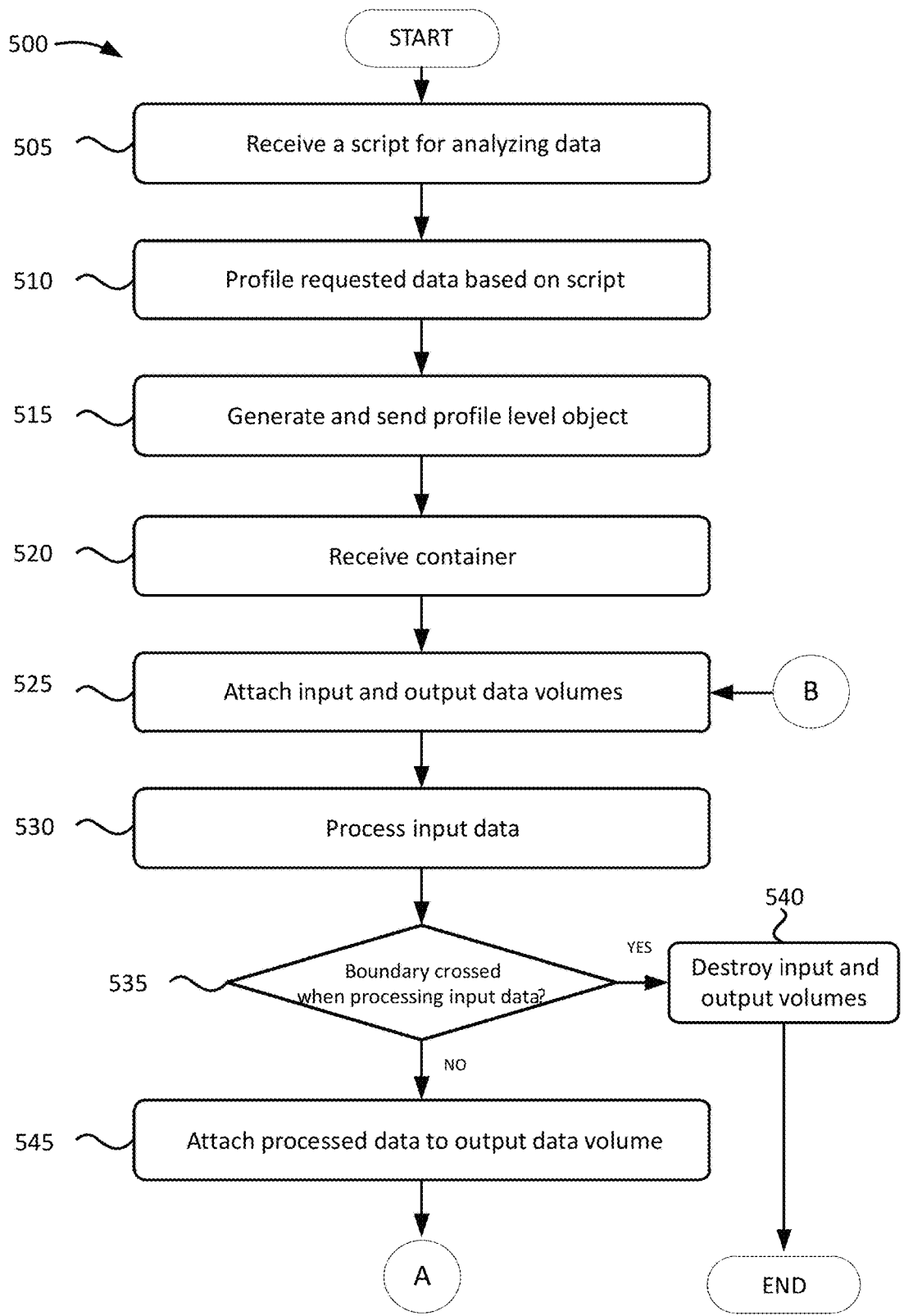
FIGS. 5A and 5B show an example flowchart of a process for processing data to satisfy data restriction requirements while minimizing data inference degradation in accordance with aspects of the present invention.
Figure 5B:
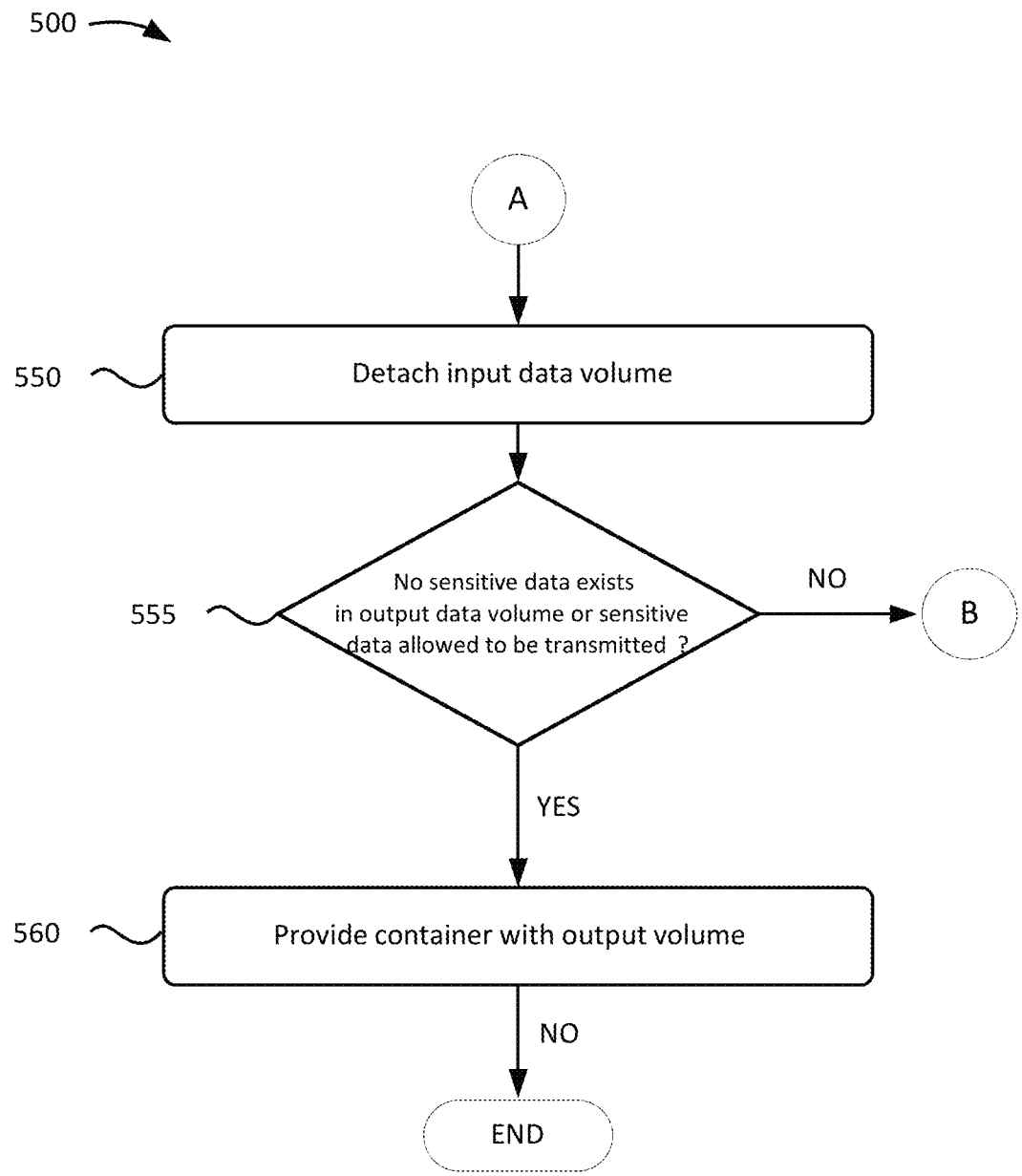

FIGS. 5A and 5B show an example flowchart of a process for processing data to satisfy data restriction requirements while minimizing data inference degradation. The steps of FIGS. 5A and 5B may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 5, process 500 includes receiving a script for analyzing data (step 505). For example, as described above with respect to FIG. 4, the data provider and compliance server 220 receives a script from the data requester server 210 which identifies the data requested for inference analysis by the data requester server 210 and analysis instructions for analyzing the data based on profiled characteristics of the data.

Process 500 also includes profiling the requested data based on the script (step 510). For example, as described above with respect to FIG. 4, the data provider and compliance server 220 profiles the requested data based on instructions included in the script. As described herein, the data provider and compliance server 220 profiles the data by identifying PII information and determining a level of sensitivity of the data. In embodiments, the profile of the data corresponds to the data's level of sensitivity.

Process 500 further includes generating and sending a profile level object (step 515). For example, as described above with respect to FIG. 4, the data provider and compliance server 220 generates a profile level object that identifies a profile level (e.g., security/sensitivity level) of the profiled data. In embodiments, the data provider and compliance server 220 sends the profile level object to the data requester server 210.

Process 500 also includes receiving a container (step 520). For example, as described above with respect to FIG. 4, the data provider and compliance server 220 receives a container from the data requester server 210. As described herein, the data requester server 210 generates the container based on the profile level object, and the container includes a set of geo-specific criteria from which input data is processed. Additionally, in embodiments, the container includes a set of applications, scripts, etc. for processing the data as part of an inference analysis of the data.

Process 500 further includes attaching input and output data volumes (step 525). For example, as described above with respect to FIG. 4, the data provider and compliance server 220 attaches an input data volume and an output data volume. In embodiments, the input data volume contains input data such as the requested data to be analyzed as identified in the script (from step 505).

Process 500 also includes processing data and attaching the processed data to the output (step 530). For example, as described above with respect to FIG. 4, the data provider and compliance server 220 processes the input data by executing the container (received at step 520). In embodiments, the input data is processed in accordance with an inference analysis of the data (e.g., to draw inferences and/or certain conclusions based on the data). Further, the data is processed with the geo-specific criteria included in the container to prevent data restrictions from being violated when processing the input data requires the input data to cross a boundary.

At step 535, a determination is made as to whether a boundary is crossed when processing the input data. For example, in embodiments, the data provider and compliance server 220 detects whether a boundary is crossed based on whether a geo-change event is detected and if the container is outside of the acceptable region (or if the region cannot be determined). If, for example, a boundary is crossed (step 535—YES), process 500 includes destroying the input and output volumes (step 540). For example, the data provider and compliance server 220 destroys the input and output volume (e.g. created at step 525) to prevent data restrictions from being violated when processing the data. In embodiments, the data provider and compliance server 220 provides a notification that the data could not be processed, and process 500 ends.

If, on the other hand, a boundary is not crossed when processing the data (step 535—NO), process 500 includes attaching the processed data to the output data volume (step 545). For example, the data provider and compliance server 220 attaches the processed data to the output data volume (e.g., the output data volume attached at step 525).

Referring to FIG. 5B, process 500 further includes detaching the input data volume (step 550). For example, as described above with respect to FIG. 4, the data provider and compliance server 220 detaches the input data volume such that only processed output data remains.

Process 500 also includes determining whether sensitive data exists in the output data volume or if sensitive data is allowed to be transmitted (step 555). For example, as described above with respect to FIG. 4, the data provider and compliance server 220 (e.g., using the sensitive data checking component 225), performs a check to ensure that the output data does not include any remaining sensitive data (e.g., PII data) or that any sensitive data that does exist is allowed to be transmitted. In embodiments, the sensitive data checking component 225 performs the sensitive data check (e.g., a PII data check) based on the destination of the data (e.g., the location and boundary of the data requester server 210). In embodiments, the sensitive data check is based on geo-specific rules indication whether data is considered to be sensitive. For example, PII data may be allowed (and considered not sensitive) if the data requester server 210 is located within a same boundary as the data provider and compliance server 220, whereas some PII data may not be allowed (and hence considered sensitive) if the data requester server 210 is located within a different boundary as the data provider and compliance server 220.

If, for example, no sensitive data exists, or if the sensitive data is allowed to be transmitted (step 555—YES), process 500 includes providing the container with the output data volume (step 560). For example, the data provider and compliance server 220 provides the container with the output data volume (including the output data attached at 545) to the data requester server 210. In this way, the data requester server 210 receives the container with compliant data (e.g., the container with the output data attached at step 545 and checked at step 555). As described herein, the data included in the received container has minimal data inference degradation since only a minimum amount of data required to be filtered by data privacy requirements is excluded. Once processing is complete, the container is undocked and returned to a master container. The master container may reside in another geo-locale but is subject to all the restrictions of the above processing steps if processed data by execution of the container is to be transmitted.

If, on the other hand, sensitive data does exist and is not allowed to be transmitted (step 555—NO), process 500 returns to step 525 in which the output data (produced at step 530 and attached at step 545), is treated as input data. Process 500 is repeated to re-process the data (e.g., at step 530). When re-processing the data, step 535 may be omitted since the data provider and compliance server 220 previously checked that processing the data did not cross the boundary. Process 500 continues to attach the processed data to the output data volume (step 545), detaching the input volume (step 550), and checking for sensitive data and if any sensitive data is allowed to be transmitted (step 555). In this way, the processing of the data is recursive in a way such that the data is reprocessed until data restrictions have been met, but only re-processed the minimum number of times to comply with the data restrictions, thus minimizing the inference degradation.

Figure 6:
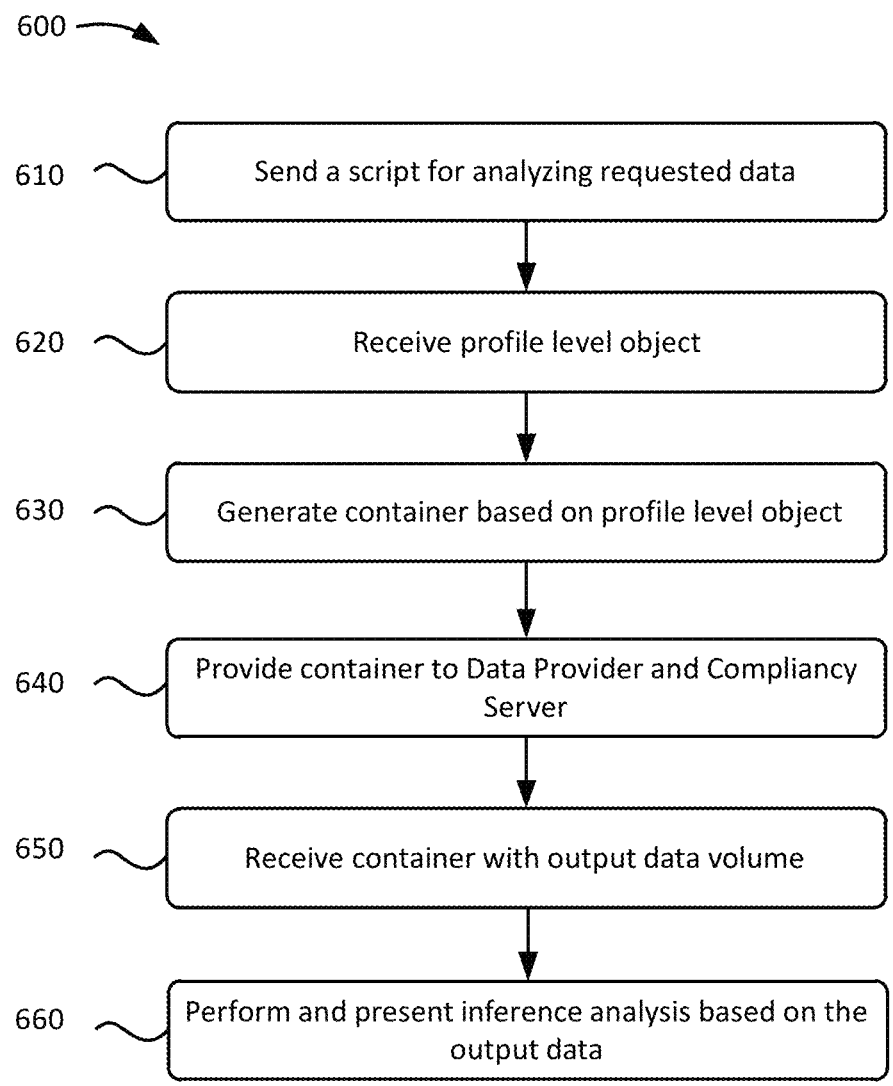
FIG. 6 show an example flowchart of receiving requested data in a manner that satisfies data restriction requirements while minimizing data inference degradation in accordance with aspects of the present invention.

FIG. 6 show an example flowchart of receiving requested data in a manner that satisfies data restriction requirements while minimizing data inference degradation. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, process 600 includes sending a script for analyzing requested data (step 610). For example, as described above with respect to FIG. 4, the data requester server 210 provides a script from to the data provider and compliance server 220. In embodiments, the script which identifies the data requested for inference analysis by the data requester server 210 and analysis instructions for analyzing the data based on profiled characteristics of the data.

Process 600 further includes receiving a profile level object (step 620). For example, as described above with respect to FIG. 4, the data requester server 210 receives a profile level object (e.g., generated by the data provider and compliance server 220) that identifies a profile level (e.g., security/sensitivity level) of the profiled data.

Process 600 also includes generating a container based on the profile level object (step 630). For example, as described above with respect to FIG. 4, the data requester server 210 generates the container based on the profile level object, and the container includes a set of geo-specific criteria from which input data is processed. Additionally, in embodiments, the container includes a set of applications, scripts, etc. for processing the data as part of an inference analysis of the data.

Process 600 further includes providing the container to the data provider and compliancy server (step 640). For example, based on generating the container (e.g., at step 630), the data requester server 210 sends the container to the data provider and compliance server 220 in order for the data provider and compliance server 220 to process the requested data (e.g., requested at step 610) in a manner that complied with data restrictions.

Process 600 further includes receiving the container with an output data volume (step 650). For example, as described above with respect to FIGS. 4 and 5, the data requester server 210 receives the container with the output data volume after the data requester server 210 provides the container to the data provider and compliance server 220, and the data provider and compliance server 220 processes the container (e.g., in accordance with process steps 525-560 of process 500 in FIG. 5). In this way, the data requester server 210 receives the container with compliant data (e.g., the container with the output data attached at step 545 and checked at step 555). As described herein, the data included in the received container has minimal data inference degradation since only a minimum amount of data required to be filtered by data privacy requirements is excluded.

Process 600 also includes performing and presenting an inference analysis based on the output data (step 660). For example, the data requester server 210, based on receiving the container with the output data, the data requester server 210 performs an analysis based on the output data and presents the analysis. As described herein compelling insights and inferences can be derived from the output data that both summarize or turn data into relevant information without retaining the PII that is attached to the data. Predictive analytics does get somewhat more complex. It involves utilizing a variety of statistical, modeling, data mining, and machine learning techniques to dig into historical data and allows analysts to make predictions. However, in accordance with aspects of the present invention, it is possible to leverage descriptive statistics and other information from which PII has been stripped and reach compelling outcomes.

Figure 7:
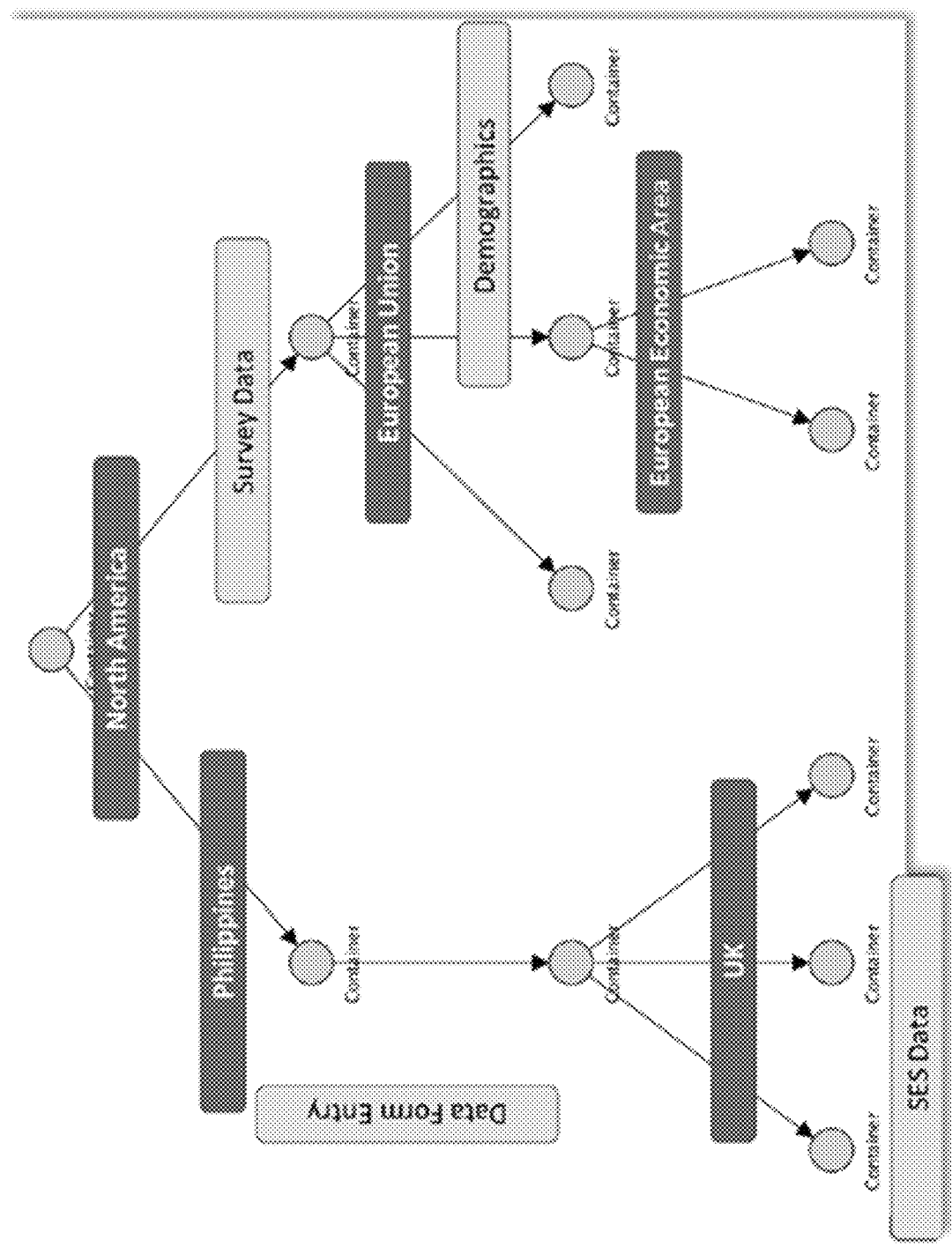
FIGS. 7 and 8 are example diagrams that illustrate transmitting data while complying with privacy restrictions in a complex geopolitical landscape in accordance with aspects of the present invention.
Figure 8:
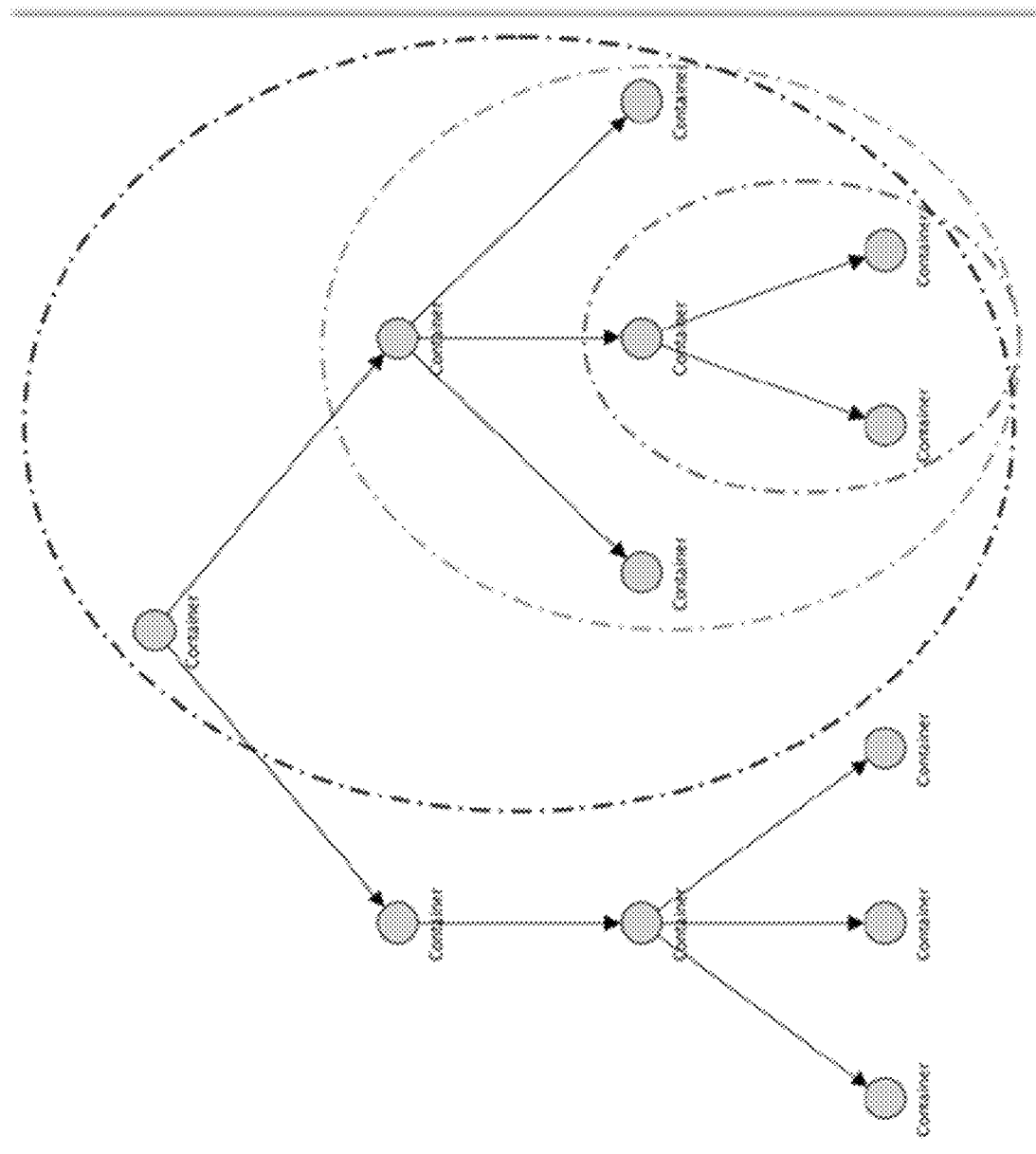

FIGS. 7 and 8 are example diagrams that illustrate transmitting data while complying with privacy restrictions in a complex geopolitical landscape. In the examples of FIGS. 7 and 8, the data used in analytics spans five separate regions, each of which may have its own complex set of legislation to live up to. Referring to FIG. 7 a combination of socio-economic data and demographics is combined with manual survey entry to collect enough data for marketing insights. Aspects of the present invention are intelligent enough to determine that data that resides within the European Economic Area (EEA) may be shared within the European Union (EU), but potentially not within the United Kingdom (UK). In embodiments, data insights that do not contain PII may be aggregated, but to the extent that PII is included, the data volumes will not be aggregated up the chain. This means that insight may decrease as information is aggregated.

An alternative view is illustrated in FIG. 8. In FIG. 8, if data is processed, analyzed and acted upon within a single geography (represented by the innermost oval), the insights have maximum actionability. No inference degradation exists. As the data is shared out of geography, certain demographic variables based on an analysis of regulation will be restricted. For example, personal information where the provider's age was not verified, and no confirmed parental consent exists for data processing activity, will be removed. The second largest oval designates an area where more data is aggregated, but less insights are in play. The analysis at this point may no longer be working on the basis of individual records, but an aggregation of fact tables and individuals. As an example, within the scope of the green circle, it may comply to work on 200,000 records containing individual demographic detail.

As the data progresses out of geography, this may become a summarized fact table that presents information in the form of age bucket and aggregated statistics. The outermost oval continues this trend. More aggregation has been performed, but less detailed insight is possible. Multiple restrictions in geography and regulation have been crossed—for example, this could be data travelling out of both EEA and EU into another space.

FIG. 9 shows example code for implementing one or more aspects of the present invention. In an example embodiment, the example code in FIG. 9 is used to pull a container from a registry of containers, execute the container, process the data, attach the input and output volume, check for sensitive information, and transmit the data. Other code from what is shown in FIG. 9 may be used for implementing aspects of the present invention.

In embodiments, aspects of the present invention provide automated analytics aggregation in a complex geographical environment. Further, aspects of the present invention address the situation in which data insight/inference decreases as information is aggregated across restricted boundaries. Further, containers are destroyed and data removed automatically to prevent unwarranted analytics. Additionally, or alternatively, aspects of the present invention improve legislative compliance with GDPR, Health Insurance Portability and Accountability Act (HIPAA), and other regulations. Aspects of the present invention ensures correct handling of data when complex aggregation, transmission, and analytics are required.

As described herein, the further the data travels from a source, the more the inference capability degrades. Accordingly, aspects of the present invention process data a minimal number of times to comply with data privacy requirements while minimizing inference degradation. Further, aspects of the present invention simulate distribution of the dataset to estimate the level of inference degradation. The optimal location for obtaining data in terms of inference degradation is generally from within a boundary from which the data resides or from a location that requires the fewest boundary crossings. Thus, co-locating with the data provides the least inference degradation, but can be costly to travel to within a boundary within which the data resides in order to obtain the data. Accordingly, aspects of the present invention simulate distribution of one or more portions of data set that can increase or decrease analytics capability to identify a level of inference degradation (e.g., based on a number of times that data has to be re-processed). Based on the level of inference degradation, an analytics teams can decide whether the benefit of re-locating to where the data resides (e.g., to reduce inference degradation) is worth the cost.

In embodiments, aspects of the present invention simulate distribution of one or more portions of data set that can increase or decrease analytics capability. Aspects of the present invention determine an optimal location for each of the one or more portions of data based on the simulation with consideration to cost of locating to the location. Aspects of the present invention process each of the one or more portions of data at respectively determined optimal locations. In embodiments, simulating distribution of the data in accordance with aspects of the present invention includes building profile characteristics of one or more portions of data, in which the profile characteristics include personal identifiable information and geographic specific rules for each of the one or more portions of data; generating a container based on the built profile; adding the generated container to a database containing a plurality of containers; responsive to a search query containing data characteristics, retrieving a container from the data that has data characteristics of the search query; and sending the retrieved docker container to a location requested by a user.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, a script identifying data requested for inference analysis;
   profiling, by the computing device, the requested data based on instructions within the script which include determining a profile level of the requested data;
   receiving, by the computing device, a container based on the profile level from a data requester server for processing the requested data as part of the inference analysis;
   attaching, by the computing device, an input data volume and an output data volume associated with the container;
   processing, by the computing device, input data stored in the input data volume to produce output data;
   attaching, by the computing device, the output data in the output data volume;
   detaching, by the computing device, the input data volume based on attaching the output data to the output data volume;
   determining, by the computing device, whether sensitive data exists in the output data volume based on a location and a boundary of the data requester server; and
   providing, by the computing device, the output data volume to the data requester server based on the determining that the sensitive data does not exist in the output data volume.

2. The computer-implemented method of claim 1, further comprising re-processing, by the computing device, the output data based on determining that the output data volume includes the sensitive data.

3. The computer-implemented method of claim 2, wherein the re-processing the output data comprises:
   re-attaching the input data volume;
   attaching the output data to the input data volume;
   re-processing the input data volume containing the output data to produced re-processed output data;
   attaching the re-processed output data to output data volume;
   detaching the input data volume;
   determining, after attaching the re-processed output data, whether the output data volume includes sensitive information;
   reprocessing the data again based on determining that the output data volume includes sensitive information; and
   providing the output data volume to the data requester server based on determining that the sensitive data does not exist in the output data volume.

4. The computer-implemented method of claim 1, wherein the determining whether the output data volume includes the sensitive data is based on geo-specific rules indicating data that is considered to be sensitive data.

5. The computer-implemented method of claim 1, further comprising:
   determining, by the computing device, whether the data crosses the boundary when processing the input data; and
   destroying, by the computing device, the input data volume and the output data volume and refraining from attaching the output data to the output data volume and refraining from providing the output data volume to the data requester server based on determining that the data crosses the boundary when processing the input data.

6. The computer-implemented method of claim 5, further comprising:
   generating and sending, by the computing device, a profile level object that identifies the profile level to the data requester server based on profiling the requested data,
   wherein the receiving the container is based on sending the profile level object to the data requester server,
   the container includes applications for processing the input data as part of the inference analysis of the data, and
   a type of the applications to include in the container is based on a type of the inference analysis to perform based on the profile level.

7. The computer-implemented method of claim 6, wherein the data requester server generates the container based on receiving the profile level object and provides the container.

8. The computer-implemented method of claim 1, wherein the sensitive data is personally identifiable information (PII).

9. The computer-implemented method of claim 1, wherein the output data meets data restrictions of a boundary within which the data requester server resides.

10. The computer-implemented method of claim 1, wherein a service provider at least one of creates, maintains, deploys and supports the computing device.

11. The computer-implemented method of claim 1, wherein the receiving the container, the attaching the input data volume and the output data volume, the processing the input data, the detaching the input data volume, the determining whether the sensitive data exists, and the providing the output data volume are provided by a service provider on a subscription, advertising, and/or fee basis.

12. The computer-implemented method of claim 1, wherein the computing device includes software provided as a service in a cloud environment.

13. The computer-implemented method of claim 1, further comprising deploying a system, comprising providing a computer infrastructure operable to perform the receiving the container, the attaching the input data volume and the output data volume, the processing the input data, the detaching the input data volume, the determining whether the sensitive data exists, and the providing the output data volume.

14. A computer program product comprising a computer readable storage medium having program instructions embodied therewith, the program instructions executable by a computing device to cause the computing device to:
   receive a script identifying data requested for inference analysis;
   profile the requested data based on instructions within the script which include determining a sensitivity level of the requested data;
   receive a container based on the sensitivity level from a data requester server for processing data as part of an inference analysis;
   attach an input data volume and an output data volume associated with the container;
   process input data stored in the input data volume to produce output data;
   attach the output data in the output data volume;
   detach the input data volume based on attaching the output data to the output data volume;
   determine whether sensitive data exists in the output data volume;
   based on determining that the sensitive data exists in the output data volume, recursively re-process the output data volume until the sensitive data no longer exists in the output data volume; and provide the output data volume to the data requester server based on determining that the sensitive data does not exist in the output data volume.

15. The computer program product of claim 14, wherein the re-processing the output data comprises:
re-attaching the input data volume;
attaching the output data to the input data volume;
re-processing the input data volume containing the output data to produced re-processed output data;
attaching the re-processed output data to output data volume;
detaching the input data volume;
determining, after attaching the re-processed output data, whether the output data volume includes sensitive information;
reprocessing the data again based on determining that the output data volume includes sensitive information; and
providing the output data volume to the data requester server based on determining that the sensitive data does not exist in the output data volume.

16. The computer program product of claim 14, wherein the determining whether the output data volume includes the sensitive data is based on geo-specific rules indicating data that is considered to be the sensitive data.

17. The computer program product of claim 14, wherein the sensitive data is personally identifiable information (PII).

18. The computer program product of claim 14, wherein the output data meets data restrictions of a boundary within which the data requester server resides.

19. A system comprising:
a processor, a computer readable memory and a computer readable storage medium associated with a computing device;
program instructions to send a script to a data provider and compliancy server that is outside of a boundary of the computing device, wherein the script includes a request for data and instructions for analyzing the requested data;
program instructions to receive a profile level object based on sending the script, wherein the profile level object identifies a sensitivity level of the requested data;
program instructions to generate a container based on the profile level object sensitivity level;
program instructions to send the container to the data provider and compliancy server;
program instructions to receive, from the data provider and compliance server, an output data volume associated with the container, without receiving an input data volume associated with the container;
program instructions to perform and present an inference analysis based on the output data, wherein the output data complies with data restrictions of the boundary within which the computing device resides; and
program instructions to include applications in the container based on a type of the inference analysis,
wherein the program instructions are stored on the computer readable storage medium for execution by the processor via the computer readable memory.

20. The system of claim 19, wherein the output data is devoid of sensitive data, wherein the sensitive data is determined based on geo-specific rules indicating data that is considered to be the sensitive data based on the boundary within which the computing device resides.

* * * * *